United States Patent
Ajiro

(10) Patent No.: US 10,156,886 B2
(45) Date of Patent: *Dec. 18, 2018

(54) CONTROL DEVICE

(71) Applicant: NEC Corporation, Tokyo (JP)

(72) Inventor: Shinya Ajiro, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/077,032

(22) Filed: Mar. 22, 2016

(65) Prior Publication Data

US 2016/0282925 A1 Sep. 29, 2016

(30) Foreign Application Priority Data

Mar. 27, 2015 (JP) .................................. 2015-066546

(51) Int. Cl.
*G06F 1/32* (2006.01)

(52) U.S. Cl.
CPC .......... *G06F 1/3212* (2013.01); *G06F 1/3206* (2013.01); *Y02D 10/174* (2018.01)

(58) Field of Classification Search
None
See application file for complete search history.

(56) References Cited

U.S. PATENT DOCUMENTS

| | | | | |
|---|---|---|---|---|
| 2005/0184975 A1* | 8/2005 | Sawada | ................. | G06F 1/1626 345/204 |
| 2007/0263250 A1* | 11/2007 | Koiwai | ................. | G06F 1/3203 358/1.15 |
| 2009/0142634 A1* | 6/2009 | Fujino | ............... | H01M 8/04619 429/421 |
| 2012/0060024 A1* | 3/2012 | Jackson | ................ | G06F 1/3212 713/100 |

FOREIGN PATENT DOCUMENTS

| | | |
|---|---|---|
| JP | 11-285180 | 10/1999 |
| JP | 2003-150281 | 5/2003 |
| JP | 2012-152039 | 8/2012 |
| JP | 2013-115927 | 6/2013 |
| JP | 2014-36538 | 2/2014 |
| WO | WO 2013/027272 | 2/2013 |

OTHER PUBLICATIONS

Japanese Office Action dated Jan. 5, 2016, by the Japanese Patent Office in counterpart Japanese Patent Application No. 2015-066546.

* cited by examiner

*Primary Examiner* — Paul Yen
(74) *Attorney, Agent, or Firm* — Finnegan, Henderson, Farabow, Garrett & Dunner, L.L.P.

(57) ABSTRACT

A control device includes a control unit that controls power supply from a power supply device and a power storage device to an information processing device, and a detection unit that detects power consumption of the information processing device. The control unit controls a value representing the characteristics of an amount of power supplied from the power supply device not to exceed a preset power supply device upper limit value, calculates a record charge and discharge amount representing a record of a past charge and discharge amount of power with respect to the power storage device based on the past power consumption detected by the detection unit, and sets a new power supply device upper limit value based on the record charge and discharge amount.

9 Claims, 10 Drawing Sheets

CONTROL DEVICE

INCORPORATION BY REFERENCE

The present invention is based upon and claims the benefit of priority from Japanese patent application No. 2015-066546, filed on Mar. 27, 2015, the disclosure of which is incorporated herein in its entirety by reference.

TECHNICAL FIELD

The present invention relates to a control device, and in particular, to a control device which controls power supplied from a power supply device and a power storage device to an information processing device. The present invention also relates to a power supply system, a program, and a power control method.

BACKGROUND ART

Recently, information processing devices are used in various systems. However, power consumption of an information processing device varies according to changes in a requested processing load and a processing state such that an application has a peak time. As such, in order to realize stable operation, power control in an information processing device is important. Particularly, in an information processing device such as a server device in which full-time operation is required, it is necessary to prevent server down due to power supply shortage.

As a technology to control power of an information processing device corresponding to the above-described situation, a technology called a power peak assist function, as shown in JP 2003-150281 A (Patent Document 1), has been known. In order to realize such a power peak assist function, first, a power supply device and a battery are provided as a power supply module. Then, in addition to power supply from the power supply device to the information processing device, the power used by the information processing device is assisted by power supply from the battery, by the power peak assist function.

Here, an example of the power peak assist function will be further described, specifically. First, in order to realize the power peak assist function, in addition to the power supply module described above, a peak assist control unit, which controls the amount of power supplied from the power supply device and the battery to the information processing device, is provided. The peak assist control unit extracts the residual amount of the battery from the power supply module, and based on the information, instructs the information processing device of permissible power consumption. Thereby, the information processing device is able to perform operation within the range of the instructed power consumption, and the power is supplied from the power supply device and the battery up to the power consumption value. Further, in the case where the residual amount of the battery is in short, the peak assist control device controls the information processing device to operate within the power value available only from the power supply device.

Patent Document 1: JP 2003-150281 A

In the peak assist function described above, an upper limit value of power available solely from the power supply device, namely a power supply device upper limit value, is fixedly set. However, if the power supply device upper limit value is set to a low value, the amount of power supplied from the power supply device is not enough, and opportunities of supplying power from the battery to the information processing device increase. In that case, the residual amount of the battery is reduced significantly, causing problems that the information processing device goes down due to battery shortage and that performance degradation is caused due to occurrence of power capping. Meanwhile, if the power supply device upper limit value is set to a high value, opportunities for supplying power from the battery are reduced, whereby advantages of the peak assist function are not taken. This causes a problem that the facilities will be wasted.

SUMMARY

In view of the above, an exemplary object of the present invention is to solve problems such as waste of facilities and power degradation, in a system having a peak assist function.

A control device, which is an exemplary aspect of the present invention, is configured to include a control unit that controls power supply from a power supply device and a power storage device to an information processing device; and a detection unit that detects power consumption of the information processing device, wherein the control unit controls a value representing the characteristics of an amount of power supplied from the power supply device not to exceed a preset power supply device upper limit value, calculates a record charge and discharge amount representing a record of a past charge and discharge amount of power with respect to the power storage device based on the past power consumption detected by the detection unit, and sets a new power supply device upper limit value based on the record charge and discharge amount.

Further, a power supply system, which is an exemplary aspect of the present invention, is configured to include a power supply module including a power supply device and a power storage device; and a control device including a control unit that controls power supply from the power supply module to an information processing device, wherein the control device includes a detection unit that detects power consumption of the information processing device, and the control unit included in the control device controls a value representing the characteristics of an amount of power supplied from the power supply device not to exceed a preset power supply device upper limit value, calculates a record charge and discharge amount representing a record of a past charge and discharge amount of power with respect to the power storage device based on the past power consumption detected by the detection unit, and sets a new power supply device upper limit value based on the record charge and discharge amount.

Further, a non-transitory computer-readable storage medium storing a program, which is an exemplary aspect of the present invention, is configured to cause a control device to realize a control unit that controls power supply from a power supply device and a power storage device to an information processing device; and a detection unit that detects power consumption of the information processing device, wherein the control unit controls a value representing the characteristics of an amount of power supplied from the power supply device not to exceed a preset power supply device upper limit value, calculates a record charge and discharge amount representing a record of a past charge and discharge amount of power with respect to the power storage device based on the past power consumption detected by the detection unit, and sets a new power supply device upper limit value based on the record charge and discharge amount.

Further, a power control method, which is an exemplary aspect of the present invention, is a power control method for controlling power supply from a power supply device and a power storage device to an information processing device. The method is configured to include controlling a value representing the characteristics of an amount of power supplied from the power supply device not to exceed a preset power supply device upper limit value;

detecting power consumption of the information processing device; and calculating a record charge and discharge amount representing a record of a past charge and discharge amount of power with respect to the power storage device based on the past power consumption detected, and setting a new power supply device upper limit value based on the record charge and discharge amount.

As the present invention is configured as described above, the present invention is able to prevent the facilities from being wasted and to improve performance, in a system having a peak assist function.

EXEMPLARY EMBODIMENTS

First Exemplary Embodiment

Figure 1:
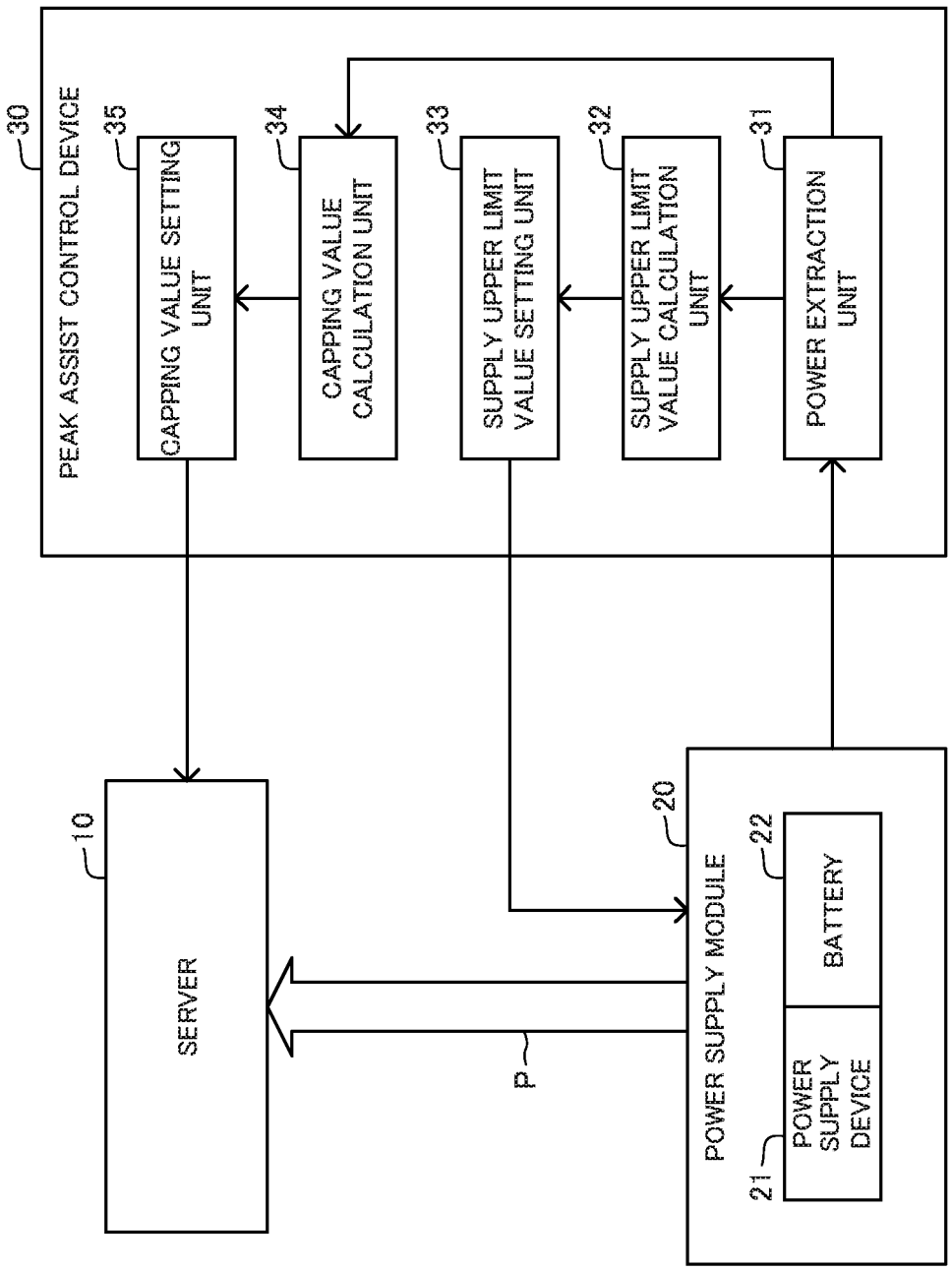
FIG. 1 is a block diagram showing a configuration of an information processing system according to a first exemplary embodiment of the present invention.
Figure 2:
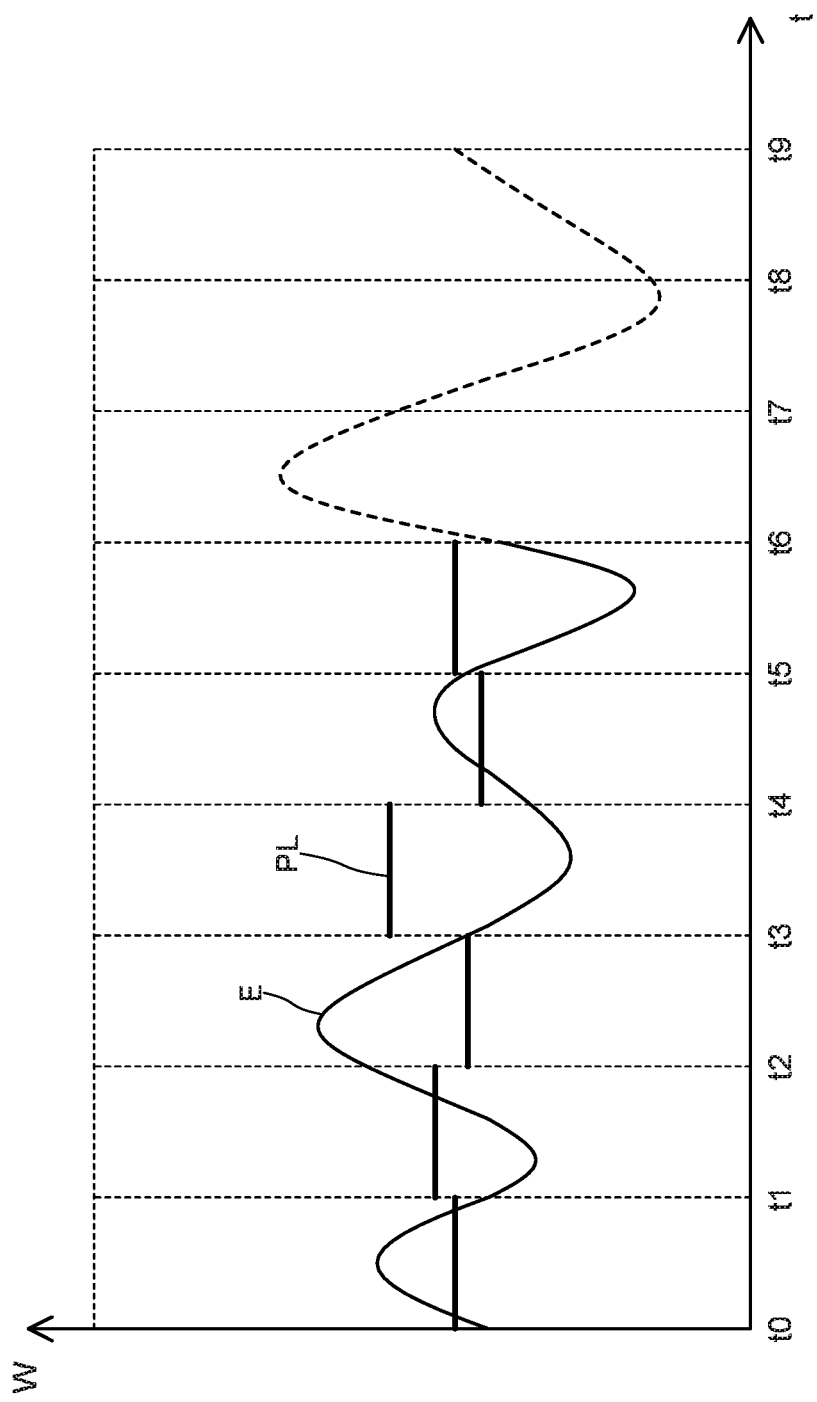
FIG. 2 is a diagram showing exemplary changes in power consumption and a PL value of the server disclosed in FIG. 1.
Figure 3:
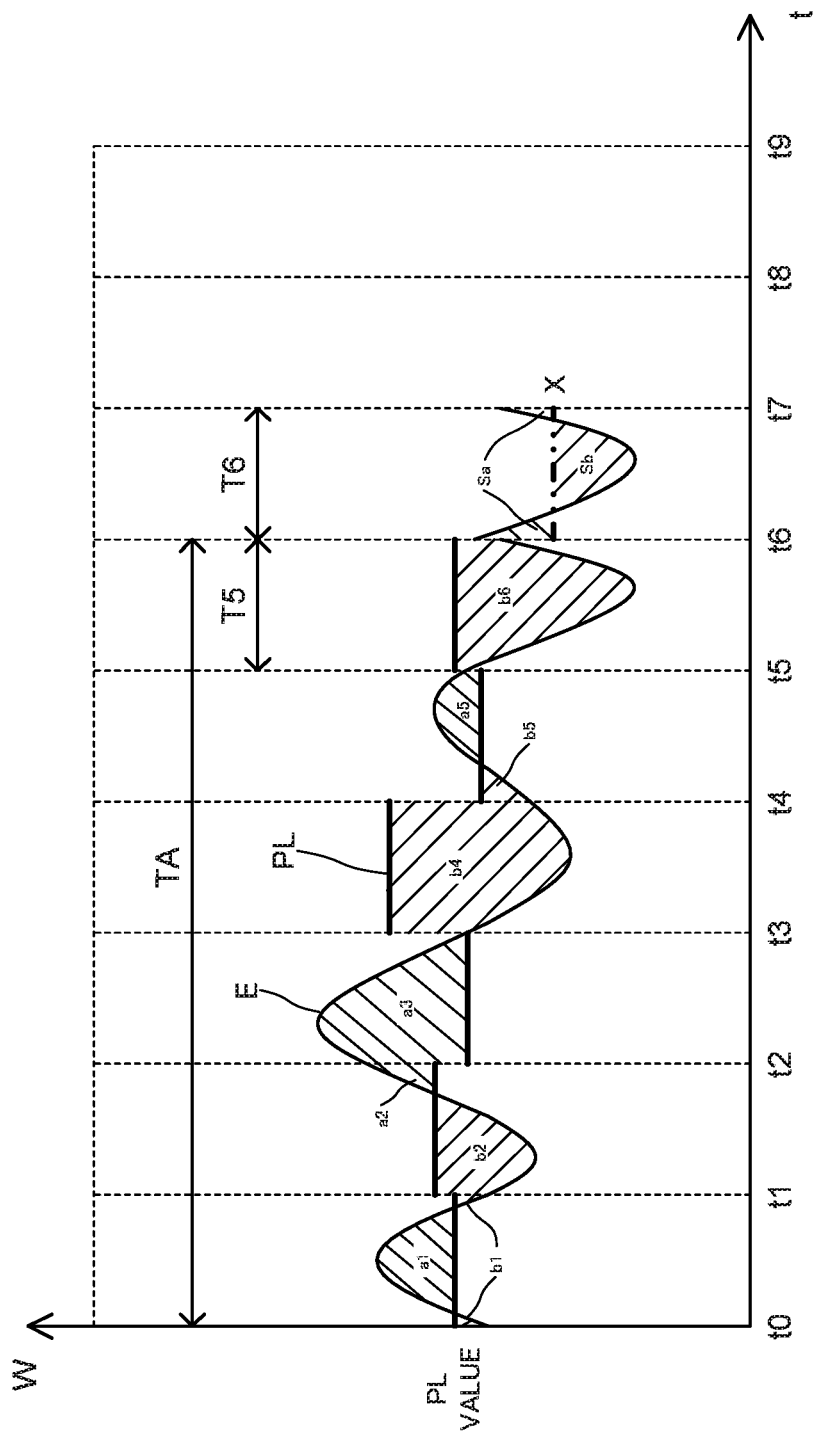
FIG. 3 is a diagram for explaining a method of setting a PL value illustrated in FIG. 2.
Figure 4:
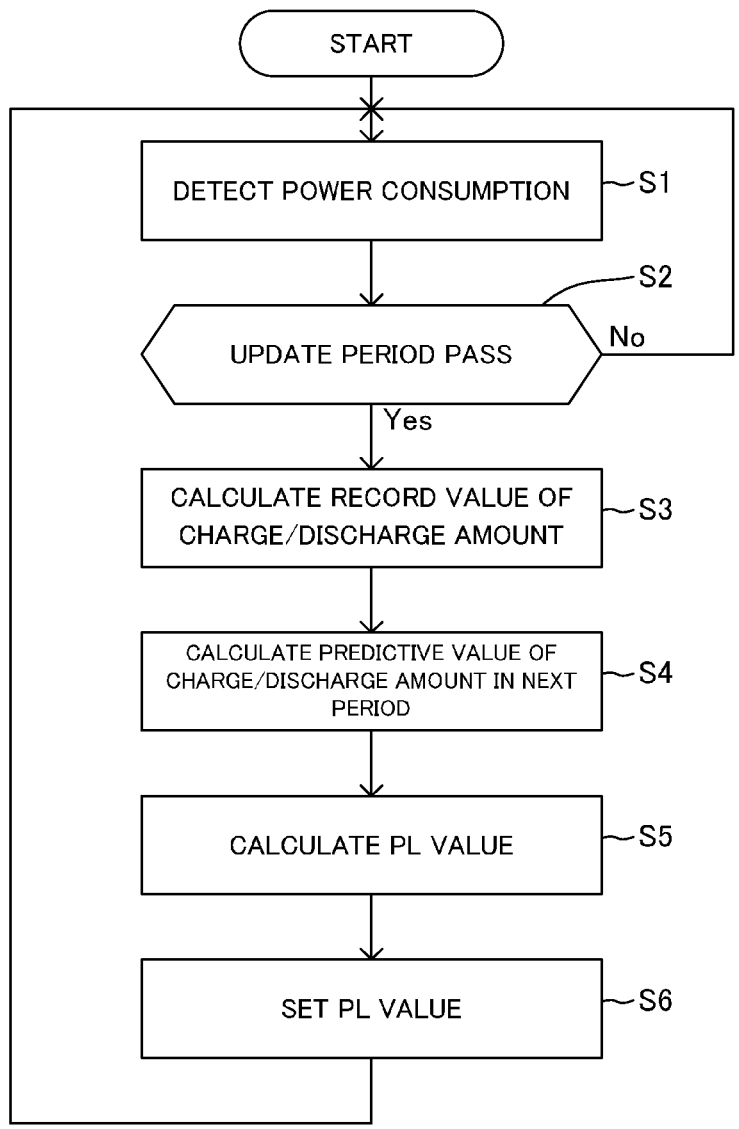
FIG. 4 is a flowchart explaining an operation of setting a PL value by the peak assist control device disclosed in FIG. 1.

A first exemplary embodiment of the present invention will be described with reference to FIGS. 1 to 4. FIG. 1 is a diagram for explaining a configuration of an information processing system according to the first exemplary embodiment. FIG. 2 is a diagram showing exemplary changes in power consumption and a PL value. FIG. 3 is a diagram for explaining a method of setting a PL value. FIG. 4 is a flowchart for explaining an operation of a peak assist control device.

As shown in FIG. 1, an information processing system of the present embodiment includes a server 10 which is an information processing device including an arithmetic unit and a storage unit, a power supply module 20 which supplies power P to the server 10, and a peak assist control device 30 which controls power supply to the server 10 by the power supply module 20.

For example, the information processing system is configured as a form of rack server. As such, the information processing system is formed such that the respective devices constituting the information processing system are stored on the respective shelves of the rack. As an example, it is configured such that a server group including a plurality of servers 10, the power supply module 20, and a rack manager including the peak assist control device 30 are mounted on respective units each of which is a shelf of the server rack. However, the information processing system is not limited to one configured as a form of rack server.

The server 10 operates with power supplied from the power supply module 20. As shown in FIG. 1, the power supply module 20 includes a power supply device 21 which converts power from an AC power supply into DC power and supplies it to the server 10, and a battery 22 (power storage device) which stores power and also supplies the power to the server 10. The power supply module 20 is configured such that the power supply device 21 and the battery 22 cooperate with each other to supply power required by the server 10. It should be noted that the battery 22 may be any device such as a capacitor if it is able to store power and supply the stored power to the server 10.

When the server 10 requires power more than the power available from the power supply device 21, power is supplied not only from the power supply device 21 but also from the battery 22, by the power supply module 20. At this time, the residual amount of power stored in the battery 22 is decreased. Meanwhile, when the server 10 requires power not more than the power available from the power supply device 21, power is supplied only from the power supply device 21. At this time, the residual amount of power that the power supply device 21 is able to supply is stored in the battery 22. Such a power supply state is realized by the operation of the peak assist function incorporated in the peak assist control device 30.

In the power supply module 20, an upper limit value of power supplied from the power supply device 21 to the server 10, namely a PL value (power supply device upper limit value), is set. As such, the power supply device 21 operates to supply power, not exceeding the set PL value, to the server 10. It should be noted that as the PL value is set in the peak assist control device 30 as described below, the amount of power supplied from the power supply device 21 is controlled not to exceed the PL value by the peak assist control device 30. In other words, when the power consumption by the server 10 exceeds the PL value, the peak assist control device 30 performs control to supply power to the server 10 not only from the power supply device 21 but also from the battery 22.

The peak assist control device 30 (control device) is configured of an information processing device having an arithmetic unit and a storage unit. The peak assist control device 30 includes a power extraction unit 31, a supply upper limit value calculation unit 32, a supply upper limit value setting unit 33, a capping value calculation unit 34, and a capping value setting unit 35, which are constructed by a program being incorporated in the arithmetic unit provided therein. The peak assist control device 30 also has the peak assist function, described above, for controlling a power supplying state to the server 10 as a basic function, although not shown.

The power extraction unit 31 (detection means) periodically detects power consumption by the server. In the present embodiment, the power extraction unit 31 detects power, supplied from the power supply module 20, as power consumption by the server 10. Then, the power extraction unit 31 notifies the supply upper limit value calculation unit 32 and the capping value calculation unit 34 of the power consumption, respectively. The power extraction unit 31 also detects the residual power of the battery 22, and notifies the the supply upper limit value calculation unit 32 and the capping value calculation unit 34 of it, respectively.

The capping value calculation unit 34 calculates an upper limit value (capping value) of power consumption of the server 10, according to the residual power of the battery 22 notified by the power extraction unit 31. For example, if the residual power of the battery 22 becomes lower than a threshold, it calculates power only available from the power supply device 21 as a capping value. Then, the capping value setting unit 35 sets the calculated capping value to the server 10. Thereby, as the server 10 operates with power not more than the capping value, it is possible to prevent server down, although the processing capability is degraded.

The supply upper limit value calculation unit 32 and the supply upper limit value setting unit 33 (control unit), described below, has a function of effectively utilizing the peak assist function by the battery 22 while keeping the residual power of the battery 22 at a predetermined amount, so as not to cause the power capping in the server 10.

The supply upper limit value calculation unit 32 calculates a PL value (power supply device upper limit value), which is an upper limit value of power supplied from the power supply device 21 to the server 10, each time a preset update period has passed. Here, a method of calculating a PL value by the supply upper limit value calculation unit 32 will be described with reference to FIGS. 2 to 4.

First, the supply upper limit value calculation unit 32 receives power consumption detected by the power extraction unit 31 and stores it (step S1 of FIG. 4), and wait until an update period passes (step S2 of FIG. 4). At this time, it is assumed that power consumption E, shown by a wavy line as shown in FIG. 2, is detected and that the current time is between t5 and t6. The update period, described above, is an interval for updating a PL value and is a constant period between the respective times (t0, t1, t2, . . . ) shown in FIG. 2. It should be noted that in FIG. 2, a bold horizontal line denoted by a reference sign PL represents a PL value set for each period. Further, power consumption E after a time t6 is described based on the prediction.

When the update period has passed, that is, in this case, a time t6 comes and an update period T5 shown in FIG. 3 has passed (Yes at step S2 of FIG. 4), the supply upper limit value calculation unit 32 first calculates a record C of a past charge/discharge amount (record charge/discharge amount) with respect to the battery 22 (step S3 of FIG. 4). The record C of the charge/discharge amount of the battery 22 is calculated from the power consumption E of the server 10 detected in the past. Specifically, for each update period, records of charge amount and discharge amount, with respect to the battery 22, are first calculated from a difference between the power consumption detected in the past and the PL value set in the past. Then, by subtracting the total sum of the discharge amounts from the total sum of the charge amounts in the entire period TA up to the preceding period (from t0 to t6), the record C of the charge/discharge amount is calculated.

Referring to the example of FIG. 3, in sections (a1, a2, a3, and a5) where the power consumption E is larger than the PL value set for each update interval, power exceeding the PL value is supplied from the battery 22 to the server 10, and such exceeding power becomes a discharge amount. Meanwhile, in sections (b1, b2, b4, b5, and b6) where the power consumption E is smaller than the PL value set for each update interval, the power less than the PL value is stored in the battery 22 from the power supply device 21, and such stored power becomes a charge amount. This means that the record C of the charge/discharge amount in the entire period TA is calculated by "(b1+b2+b4+b5+b6)−(a1+a2+a3+a5)". It should be noted that a charge amount or a discharge amount in each period can be calculated by integrating the power consumption E while considering the PL value.

Then, the supply upper limit value calculation unit 32 calculates a predictive value of the charge/discharge amount (predictive charge/discharge amount) of the battery 22 in the subsequent update period (step S4 of FIG. 4). At this time, a predictive value of the charge/discharge amount of the battery 22 is calculated by predicting the power consumption of the following update period to be the same as the power consumption of the preceding update period, and using such power consumption.

Referring to the example of FIG. 3, at a current point where the time t6 has passed, a waveform representing the power consumption detected in the preceding update period T5 is directly used as power consumption of the following update period T6 which is a prediction target period. Then, a new PL value (X) for the update period T6 is set temporarily, and with a power amount exceeding the PL value (X) being a discharge amount Sa and a power amount less than the PL value (X) being a charge amount Sb, a difference (Sb−Sa) between the charge amount Sb and the discharge amount Sa is calculated as a predictive value.

Then, based on the record C of the charge/discharge amount in the past entire period TA and the predictive value (Sb−Sa) of the charge/discharge amount in the following period T6, obtained as described above, the supply upper limit value calculation unit 32 calculates the PL value (X) of the following period T6 (step S5 of FIG. 4). Specifically, the supply upper limit value calculation unit 32 calculates the PL value (X) such that the sum of the record C and the predictive value (Sb−Sa) becomes "0", that is, "C+(Sb−Sa)= 0". For example, if C=0, the PL value (X) is calculated so as to be Sb=Sa. Further, if C>0, the PL value (X) is calculated so as to be Sb<Sa, while if C<0, it is calculated so as to be Sb>Sa. Then, the supply upper limit value calculation unit 32 notifies the supply upper limit value setting unit 33 of the calculated PL value (X).

The supply upper limit value setting unit 33 sets the PL value (X), calculated as described above, in the power supply module 20 as the PL value (X) of the update period T6 (step S6 of FIG. 4). Thereby, the power supply device 21 operates to supply power, with the set PL value being the upper limit, to the server 10 during the update period T6. This means that the supply upper limit value setting unit 33 performs control such that the power supply amount of the power supply device 21 does not exceeds the PL value. At this time, the supply upper limit value setting unit 33 may perform control such that the power supply amount of the power supply device 21 does not exceed the PL value itself or perform control such that the power supply amount does not exceed a value lower by a predetermined value than the PL value as a safe value. It should be noted that when the power supply device 21 controls the amount of power supply to the server 10, it may perform control using a value representing characteristics of the power supply amount such as a power value (W) or a current value (A). Accordingly, the PL value may also be set as a value representing the characteristics of the power supply amount such as a power value (W) or a current value (A). It should be noted that a value representing the characteristics of the power supply amount may be any value not limited to a power value (W) or a current value (A).

Then, power consumption of the server 10 is detected and recorded until the next update period passes. When the next update period has passed, a PL value of the following update period is calculated and set, as described above. Then, each time an update period passes, a PL value of the following update period is calculated and set repeatedly.

As described above, in the present invention, a new PL value is calculated and set from the power consumption of the server 10, using a record of a charge/discharge amount of the battery 22 and a predictive value of the subsequent charge/discharge amount. Thereby, it is possible to set an appropriate PL value according to the past actual operating state of the server 10. As such, it is possible to effectively utilize the peak assist function by the operation of the battery 22, while preventing excessive reduction of the residual power of the battery 22. Consequently, facilities can be efficiently used without waste, and the performance of the peak assist function can be improved.

In the present invention, a PL value is calculated based on the past record C of the charge/discharge amount and a predictive value (Sb−Sa) of the subsequent charge/discharge amount. More specifically, a PL value is calculated such that "C+(Sb−Sa)=0" is satisfied. However, in the present invention, the method calculating a PL value as described above is an example. A PL value may be calculated by another method. For example, a PL value may be calculated such that the sum of the record C and a predictive value (Sb−Sa) is close to 0, rather than the sum being 0. Further, a PL value may be calculated such that the charge/discharge amount of the battery 22 itself is balanced, which means that the past (record) charge/discharge amount and the subsequent (predictive) charge/discharge amount are balanced or that subsequent (predictive) charge amount and discharge amount are balanced. Further, a PL value may be calculated by another expression using the record C and a predictive value (Sb−Sa). Further, a PL value may be calculated using either one of the past record C of charge/discharge amount and a predictive value (Sb−Sa) of the subsequent charge/discharge amount.

For example, in the case of only using the past record C of charge/discharge amount, a subsequent PL value may be set according to positive/negative or magnitude of the value of the record C. For example, if the record C is a negative value, a PL value is set to a value defined as relatively large, so as to increase the probability that the battery 22 is charged in the subsequent period. Further, in the case of only using a predictive value of the subsequent charge/discharge amount, a PL value may be set such that Sb and Sa become equal, for example.

Second Exemplary Embodiment

Figure 5:
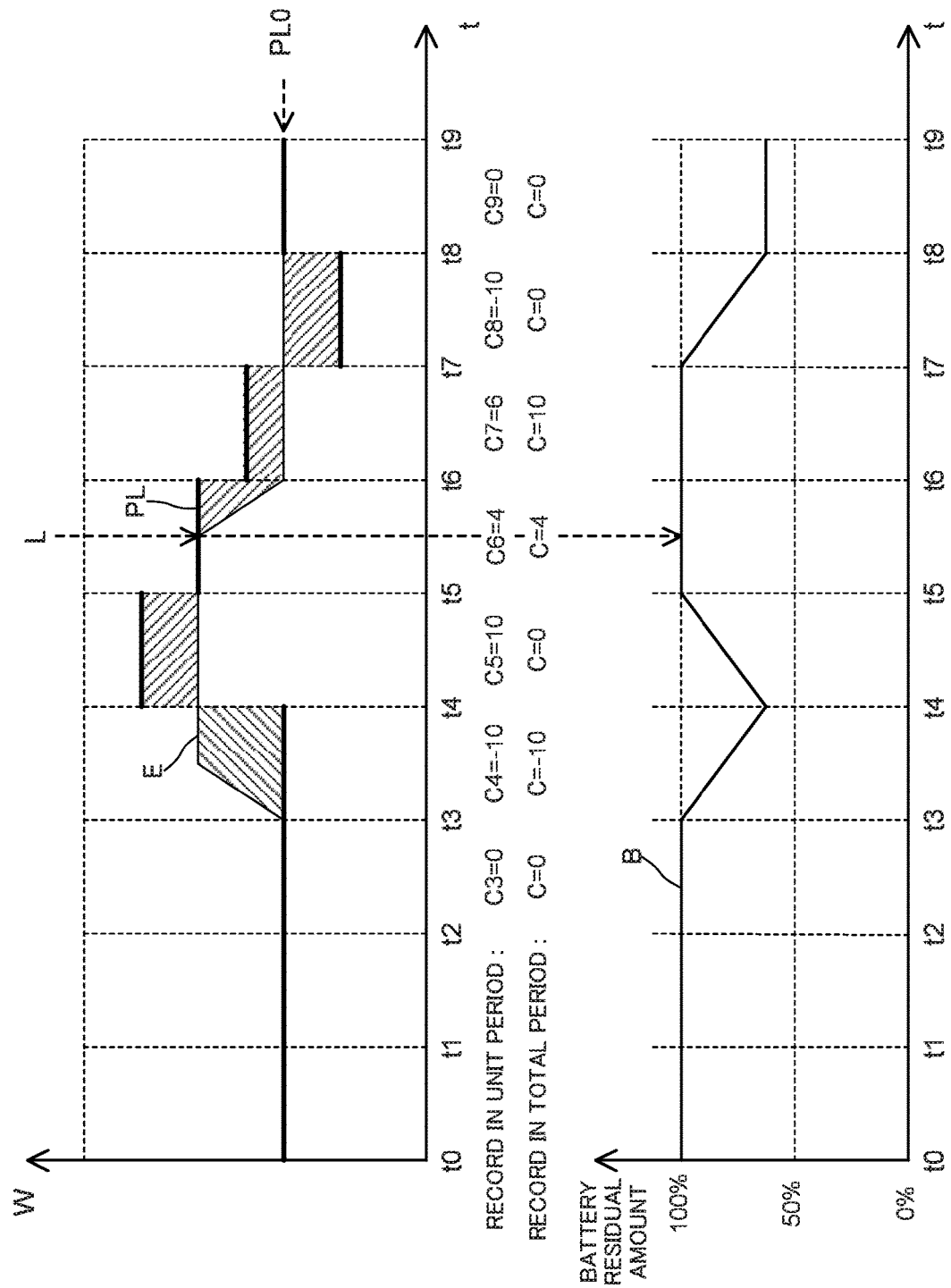
FIG. 5 is a diagram showing exemplary displacements of power consumption and a PL value of a server in an information processing system related to a second exemplary embodiment of the present invention.
Figure 6:
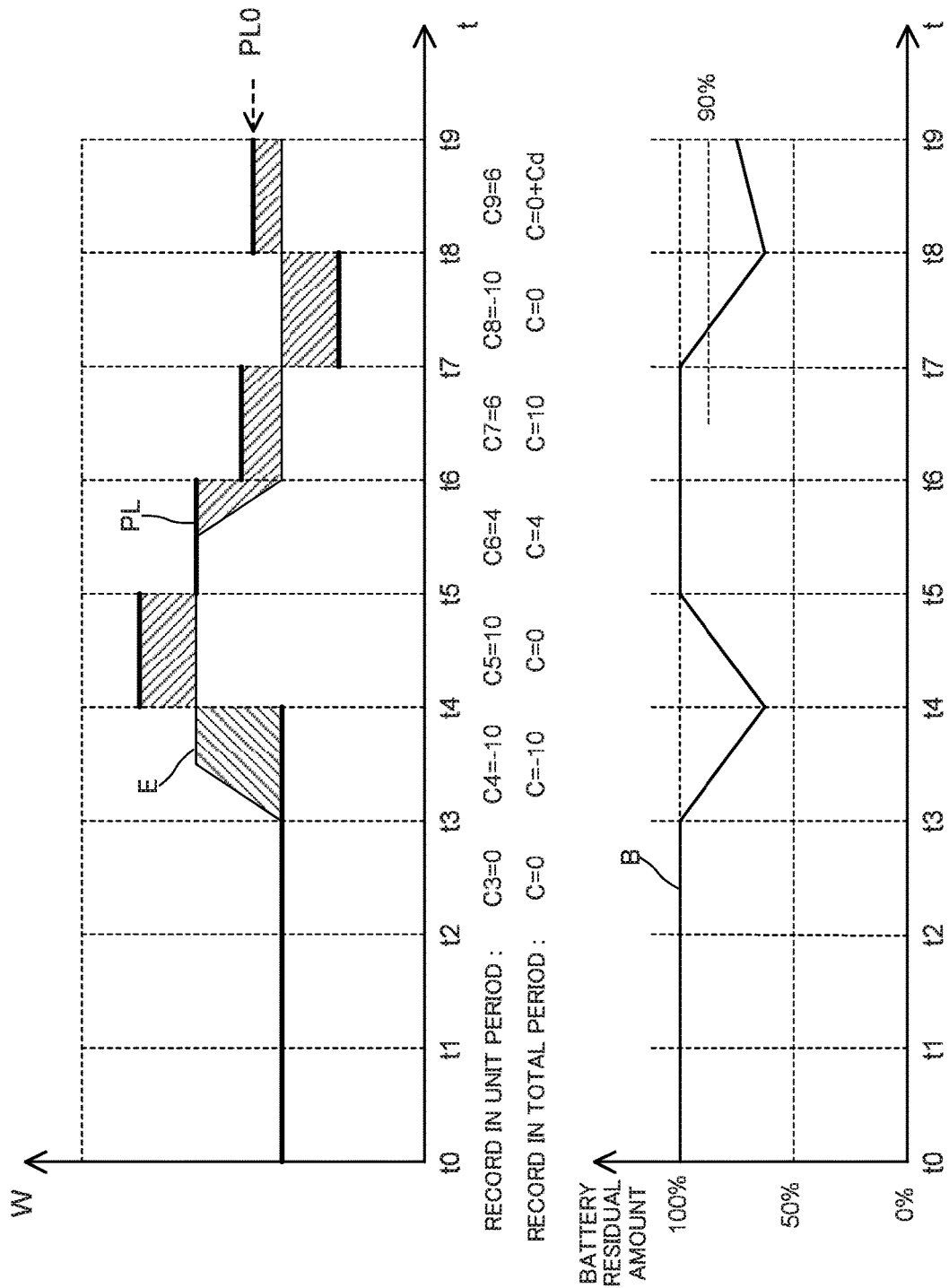
FIG. 6 is a diagram showing exemplary displacements of power consumption and a PL value of a server in an information processing system according to a second exemplary embodiment of the present invention.
Figure 7:
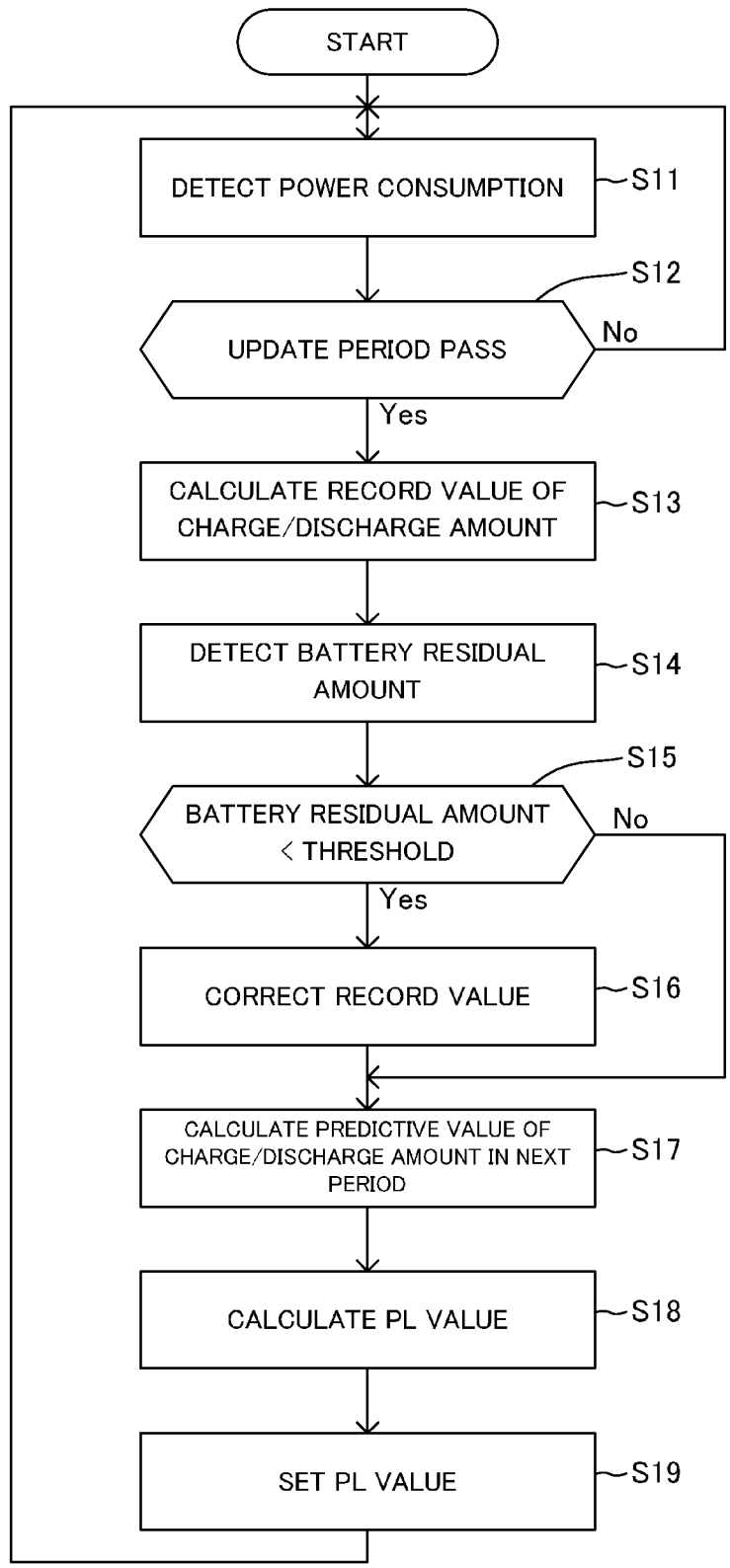
FIG. 7 is a flowchart explaining an operation of setting a PL value in the information processing system according to the second exemplary embodiment of the present invention.

Next, a second exemplary embodiment of the present invention will be described with reference to FIGS. 5 to 7. FIG. 5 is a diagram showing exemplary changes in power consumption and a PL value related to the second exemplary embodiment. FIG. 6 is a diagram showing exemplary changes in power consumption and a PL value in the second exemplary embodiment. FIG. 7 is a flowchart for explaining an operation of a peak assist control device.

An information processing system of the present embodiment has an almost similar configuration to that of the first exemplary embodiment described above. This means that the information processing system of the present embodiment has the configuration shown in FIG. 1. However, the present embodiment differs from the first exemplary embodiment in that the functions of the power extraction unit 31 and supply upper limit value calculation unit 32, included in the peak assist control device 30, differ from those in the first exemplary embodiment. Hereinafter, description will be given mainly on the point different from the first exemplary embodiment.

First, the power extraction unit 31 (detection unit) detects and stores power supplied from the power supply module 20 as power consumption by the server 10. The power extraction unit 31 also detects the residual power of the battery 22 when calculating a new P1 value after an update period has passed, as described below. Then, the power extraction unit 31 notifies the supply upper limit value calculation unit 32 of the detected power consumption of the server 10 and the residual power of the battery 22.

Further, each time a preset update period passes, the supply upper limit value calculation unit 32 (control unit) calculates a PL value (power supply device upper limit value) which is an upper limit value of the power supplied from the power supply device 21 to the server 10. Here, a method of calculating a PL value by the supply upper limit value calculation unit 32 will be described with reference to FIGS. 5 to 7.

First, it is assumed that the supply upper limit value calculation unit 32 calculates a PL value by the same method as that of the first exemplary embodiment, so that power consumption E, a PL value (PL), and a battery residual amount of the battery B as shown in FIG. 5 are obtained. In this example, the residual amount of the battery B is 100% at the beginning. Then, focusing on after a time L, as the power consumption E is reduced with respect to the PL value (PL) from the time L to the time t6, the battery 22 should be charged. However, in this example, as the residual amount of the battery B is 100%, no further charging is possible. Then, at a time t8, the residual power B of the battery 22 becomes a lower value than the initial 100%, although the record C of the charge/discharge amount is 0. This means that a gap is caused between the record C of the charge/discharge amount and the actual residual power B of the battery 22. In order to solve such a situation, the supply upper limit value calculation unit 32 of the present embodiment calculates a PL value by a method described below.

First, the supply upper limit value calculation unit 32 receives and stores power consumption detected by the power extraction unit 31 (step S11 of FIG. 7), and waits until an update period passes (step S12 of FIG. 7). In this example, it is assumed that the current time is between t7 and t8. After the update period passes, in this example, at a time t8 (Yes at step S12 of FIG. 4), the past record C of the charge/discharge amount (record charge/discharge amount) with respect to the battery 22 is calculated (step S13 of FIG. 7).

Then, the supply upper limit value calculation unit 32 acquires the residual power B of the battery 22 detected by the power extraction unit 31 (step S14 of FIG. 7), and checks whether or not the residual power B of the battery 22 is not less than a preset threshold D (step S15 of FIG. 7). It should be noted that in this example, comparison between the residual power B with the threshold D is determined according to the ratio of the residual power to the capacity of the battery 22, and it is assumed that the threshold D=90%.

At this time, if the residual power B of the battery 22 is not less than the threshold D (No at step S15 of FIG. 7), a PL value is calculated by the same method as that in the first exemplary embodiment (steps S17, S18, and S19 of FIG. 7). On the other hand, if the residual power B of the battery 22 is less than the threshold D, that is, if the residual power B is less than 90% in this example (Yes at step S15 of FIG. 7), a PL value is calculated by a method described below.

If the residual power B of the battery 22 is less than the threshold D, namely less than 90%, first, the supply upper limit value calculation unit 32 corrects the record C of the charge/discharge amount of the battery 22 calculated as described above (step S16 of FIG. 7). In this example, the supply upper limit value calculation unit 32 corrects the record C of the charge/discharge amount so as to be able to calculate a PL value with which the charge amount of the battery 22 is increased. For example, the supply upper limit value calculation unit 32 calculates a correction value Cd for correcting the record C of the charge/discharge amount so as to be able to calculate a PL value with which the charged amount of the battery 22 can be recovered by "(100%− threshold (90%))", that is, "10%", in the following period.

Then, the supply upper limit value calculation unit 32 calculates a predictive value (predictive charge/discharge amount) of the battery 22 for the subsequent update period (step S17 of FIG. 7). At this time, a predictive value of the charge/discharge amount of the battery 22 is calculated by using the power consumption of the preceding period based on the assumption that the power consumption of the following update period is the same as the power consumption of the preceding period.

Then, based on the record C of the charge/discharge amount and the correction value Cd and on the predictive value (Sb−Sa) of the charge/discharge amount in the following period, calculated as described above, the supply upper limit value calculation unit 32 calculates a PL value of the following period (step S18 of FIG. 4). Specifically, the supply upper limit value calculation unit 32 calculates a PL value such that the sum of the record C, the correction value Cd, and the predictive value (Sb−Sa) becomes "0" ("(C+ Cd)+(Sb−Sa)=0"). At this time, the correction value Cd of the record C is set to be a value capable of increasing the charge amount of the battery 22 in the subsequent period t8 to t9, by newly setting the calculated PL value. For example, in the example of FIG. 6, a correction value Cd for decreasing the value of the record C (in this example, Cd<0) is used. As such, as shown in FIG. 6, the calculated PL value (PL1) becomes a higher value compared with the PL value (PL0) of the case shown in FIG. 5 calculated without using the correction value Cd.

Then, the supply upper limit value calculation unit 32 notifies the the supply upper limit value setting unit 33 of the calculated PL value (PL1), whereby the PL value (PL1) of the period t8-t9 is set in the power supply module 20 (step S19 of FIG. 7). Thereby, the residual power B of the battery 22 is increased in the period t8-t9 as shown in FIG. 6.

Then, power consumption of the server 10 is detected and recorded until the next update period passes. When the next update period has passed, a PL value of an update period immediately after the period is calculated and set, as described above. Then, each time an update period passes, a PL value of the following update period is calculated and set repeatedly.

As described above, in the present invention, a new PL value is calculated and set based on the power consumption of the server 10 and the residual power of the battery 22. Specifically, if the residual power of the battery 22 is not more than a threshold, the past record C of the charge/ discharge amount of the battery 22, which is a value based on the power consumption, is corrected, and a new PL value is calculated and set using the record C and the correction value Cd and a predictive value (Sb−Sa) of the subsequent charge/discharge amount. Thereby, it is possible to improve reduction of the charge amount caused by the fact that the calculated record of charge/discharge amount differs from the actual residual power of the battery 22. As such, an appropriate PL value according to the past actual operating state of the server 10 can be set, and the peak assist function by the operation of the battery 22 can be utilized effectively, while suppressing an excessive decrease in the residual power of the battery 22. Consequently, facilities can be efficiently utilized without waste, and the performance of the peak assist function can be improved.

In the present invention, a PL value is calculated using the past record C of charge/discharge amount, the correction value Cd, and a predictive value (Sb−Sa) of the subsequent charge/discharge amount. However, in the present invention, the method of calculating a PL value as described above is an example. A PL value may be calculated by another method. For example, a PL value may be calculated such that the sum of a record C, a correction value Cd, and a predictive value (Sb−Sa) is close to 0, rather than the sum being 0. Further, a PL value may be calculated such that the corrected past charge/discharge amount of the battery 22 and the subsequent charge/discharge amount are balanced. A PL value may also be calculated by another expression, or may be calculated only using the past record C of charge/ discharge amount and the correction value Cd thereof. For example, in the case of only using the past record C of charge/discharge amount and the correction value Cd, a subsequent PL value may be set according to positive/ negative or magnitude of the value. In the present invention, a method of calculating the correction value Cd described above is not limited to that described above.

Third Exemplary Embodiment

Figure 8:
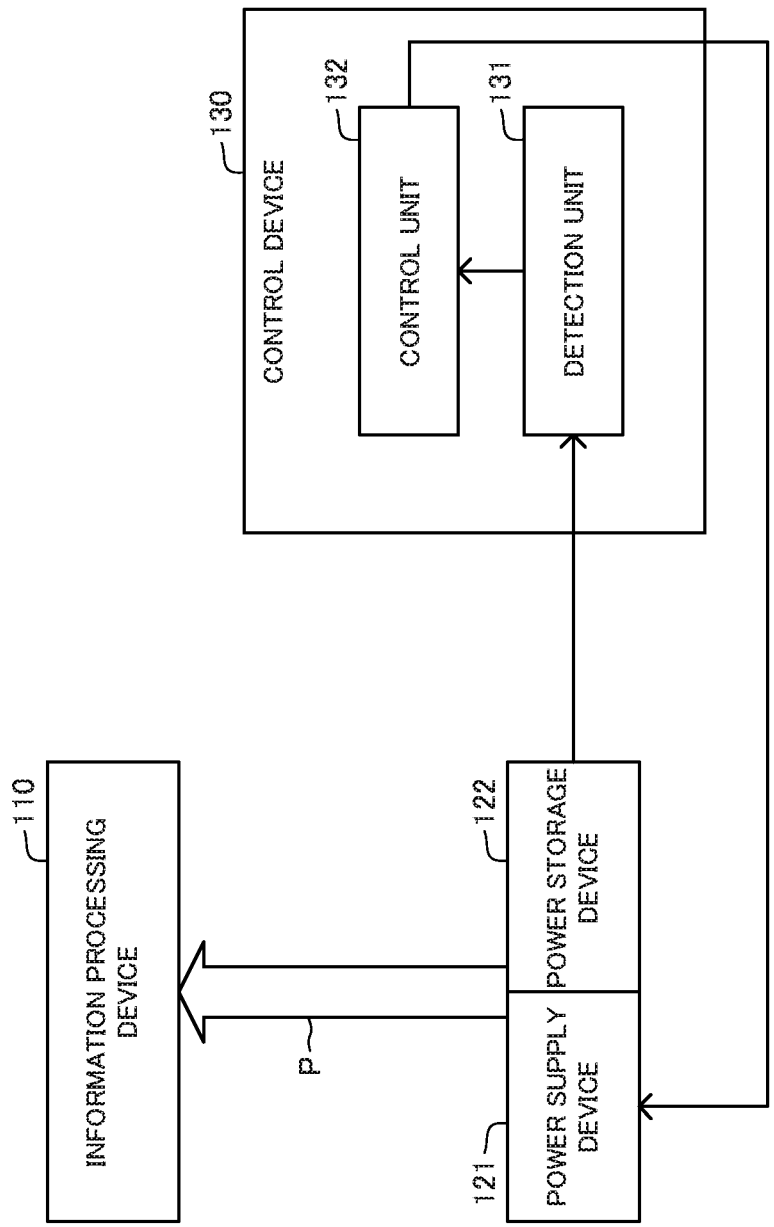
FIG. 8 is a block diagram showing a configuration of an information processing system according to third to fifth exemplary embodiments of the present invention.

Next, a third exemplary embodiment of the present invention will be described with reference to FIGS. 8 to 10. FIG. 8 is a block diagram showing a configuration of an information processing system of the present invention, and FIGS. 9 and 10 are flowchart showing an operation of the control device.

As shown in FIG. 8, the information processing system includes an information processing device 110, a power supply device 121, a power storage device 122, and a control device 130. The control device 130 includes a detection unit 131 and a control unit 132 which are constructed by a program being executed by the arithmetic unit provided therein. The control unit 132 has a function of controlling supply of power P to the information processing device 110 by the power supply device 121 and the power storage device 122, as a basic function.

Figure 9:
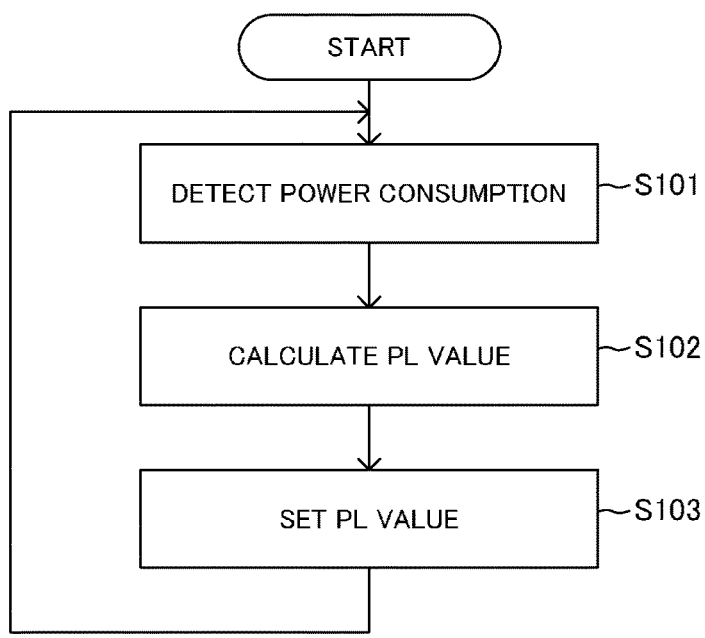
FIG. 9 is a flowchart showing an operation of the information processing system according to the third exemplary embodiment of the present invention.
Figure 10:
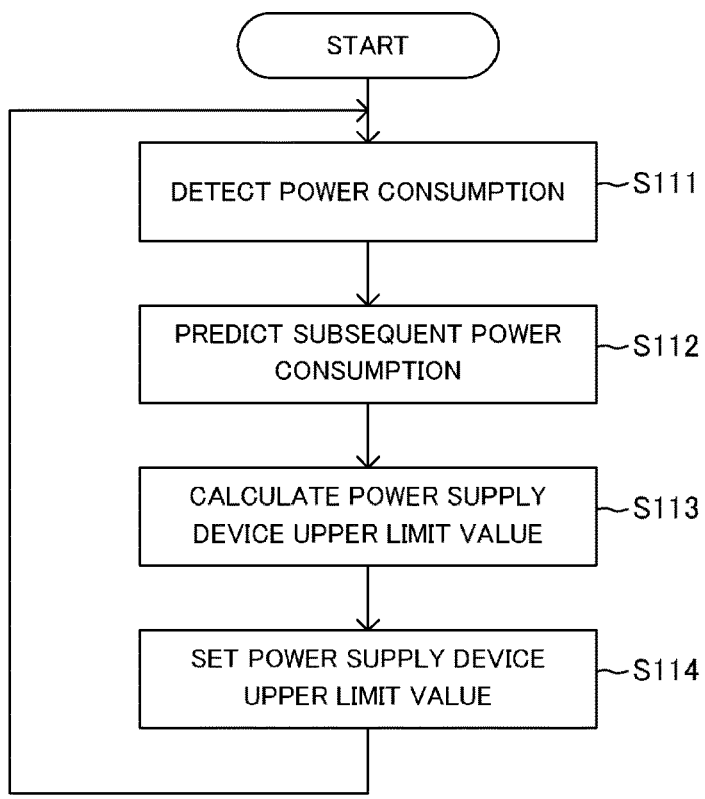
FIG. 10 is a flowchart showing an operation of the information processing system according to the third exemplary embodiment of the present invention.

The detection unit 131 detects power consumption of the information processing device (step S101 of FIG. 9, step S111 of FIG. 10). For example, the detection unit 131 detects power consumption by measuring the power P actually supplied to the information processing device 110 from the power supply device 121 and the power storage device 122.

The control unit 132 newly calculates a power supply device upper limit value, which is an upper limit value of a power amount supplied from the power supply device 121 to the information processing device 110, based on the past power consumption detected by the detection unit 131 (step S102 of FIG. 9). At this time, the control unit 132 may predict subsequent power consumption based on the detected past power consumption, and calculate a new power supply device upper limit value based on the predicted power consumption (steps S112 and S113 of FIG. 10).

Then, the control unit 132 sets the calculated new power supply device upper limit value in the power supply device 121 (step S103 of FIG. 9, step S114 of FIG. 10), and performs control such that a value representing the characteristics of the power supply amount from the power supply device 121 (for example, a power value (W) or a current value (A) to be supplied) does not exceed the power supply device upper limit value.

Thereby, in the information processing system, as a power supply device upper limit value is set according to a past change in the power consumption, the stored amount of power in the power storage device 122 is increased or decreased according to the operating state of the information processing device 110. Consequently, it is possible to prevent an excessive decrease in the stored amount of power in the power storage device 122, and to effectively utilize the power storage device 122, which prevents the facilities from being wasted, and improves the performance of the peak assist function.

Fourth Exemplary Embodiment

Next, a fourth exemplary embodiment of the present invention will be described with reference to FIGS. 8 and 11. FIG. 8 is a block diagram showing a configuration of an information processing system of the present invention, and FIG. 11 is a flowchart showing an operation of the control device.

As shown in FIG. 8, the information processing system includes the information processing device 110, the power supply device 121, the power storage device 122, and the control device 130. The control device 130 includes a detection unit 131 and a control unit 132 which are constructed by a program being executed by the arithmetic unit provided therein. The control unit 132 has a function of controlling supply of power P to the information processing device 110 by the power supply device 121 and the power storage device 122, as a basic function.

Figure 11:
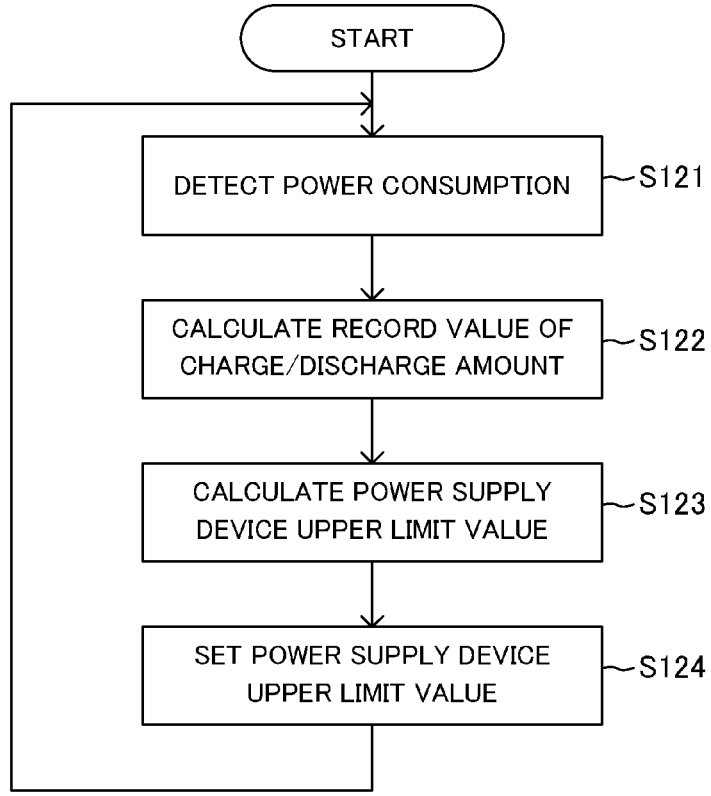
FIG. 11 is a flowchart showing an operation of the information processing system according to the fourth exemplary embodiment of the present invention.

The detection unit 131 detects power consumption of the information processing device (step S121 of FIG. 11). For example, the detection unit 131 detects power consumption by measuring the power P actually supplied to the information processing device 110 from the power supply device 121 and the power storage device 122.

The control unit 132 calculates a record charge/discharge amount representing a record of past power charge/discharge amount with respect to the power storage device 122, based on the past power consumption detected by the detection unit 131 (step S122 of FIG. 11) Then, based on the calculated record charge/discharge amount, the control unit 132 newly calculates a power supply device upper limit value which is an upper limit value of power supplied from the power supply device 121 to the information processing device 110 (step S123 of FIG. 11).

Then, the control unit 132 sets the calculated new power supply device upper limit value in the power supply device 121 (step S124 of FIG. 11), and performs control such that the value representing the characteristics of the power supply amount from the power supply device 121 does not exceed the power supply device upper limit value.

Thereby, in the information processing system, as a power supply device upper limit value is set according to a past change in the power consumption, the stored amount of power in the power storage device 122 is increased or decreased according to the operating state of the information processing device 110. Consequently, it is possible to prevent an excessive decrease in the stored amount of power in the power storage device 122, and to effectively utilize the power storage device 122, which prevents the facilities from being wasted, and improves the performance of the peak assist function.

Fifth Exemplary Embodiment

Next, a fifth exemplary embodiment of the present invention will be described with reference to FIGS. 8 to 12. FIG. 8 is a block diagram showing a configuration of an information processing system of the present invention, and FIG. 11 is a flowchart showing an operation of a control device.

As shown in FIG. 8, the information processing system includes the information processing device 110, the power supply device 121, the power storage device 122, and the control device 130. The control device 130 includes the detection unit 131 and the control unit 132 which are constructed by a program being executed by the arithmetic unit provided therein. The control unit 132 has a function of controlling supply of power P to the information processing device 110 by the power supply device 121 and the power storage device 122, as a basic function.

Figure 12:
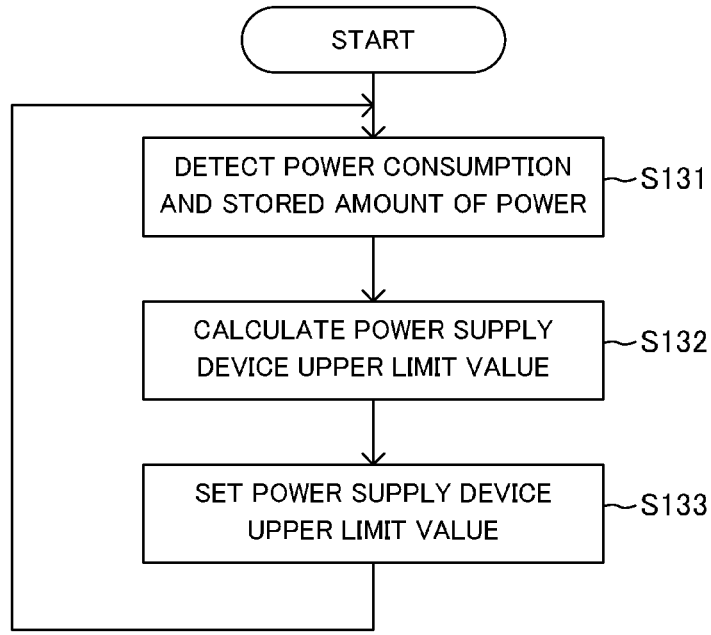
FIG. 12 is a flowchart showing an operation of the information processing system according to the fifth exemplary embodiment of the present invention.

The detection unit 131 detects power consumption of the information processing device 110 and the stored amount of power in the power storage device 122 (step S131 of FIG. 12). Power consumption is detected by measuring the power P actually supplied to the information processing device 110 from the power supply device 121 and the power storage device 122, for example.

The control unit 132 newly calculates a power supply device upper limit value which is an upper limit value of the amount of power supplied from the power supply device 121 to the information processing device 110, based on the power consumption and the stored amount of power detected by the detection unit 131 (step S132 of FIG. 12). For example, if the stored amount of power is not more than a threshold, the control unit corrects the value obtained based on the power consumption, and calculates a new power supply device upper limit value based on the corrected value.

Then, the control unit 132 sets the calculated new power supply device upper limit value in the power supply device 121 (step S133 of FIG. 12), and performs control such that a value representing the characteristics of the power supply amount from the power supply device 121 does not exceeds the power supply device upper limit value.

Thereby, in the information processing system, as a power supply device upper limit value is set according to changes in the power consumption and the stored amount of power, the stored amount of power in the power storage device 122 is increased or decreased according to the operating state of the information processing device 110. Consequently, it is possible to prevent an excessive decrease in the stored amount of power in the power storage device 122, and to effectively utilize the power storage device 122, which prevents the facilities from being wasted, and improves the performance of the peak assist function.

<Supplementary Notes>

The whole or part of the exemplary embodiments disclosed above can be described as, but not limited to, the following supplementary notes. Hereinafter, outlines of the configurations of a control device, a program, and a power control method according to the present invention will be described. However, the present invention is not limited to the configurations described below.

(Supplementary Note 1)

A control device comprising:

a control unit that controls power supply from a power supply device and a power storage device to an information processing device; and a detection unit that detects power consumption of the information processing device, wherein the control unit controls a value representing a characteristic of an amount of power supplied from the power supply device not to exceed a preset power supply device upper limit value, calculates a record charge and discharge amount representing a record of a past charge and discharge amount of power with respect to the power storage device based on past power consumption detected by the detection unit, and sets a new power supply device upper limit value based on the record charge and discharge amount.

According to the above-described invention, in the information processing device to which power is supplied from the power supply device and the power storage device, the control device first calculates a record charge and discharge amount representing a record of a charge and discharge amount of power of the power storage device from the past power consumption. Then, the control device sets a power supply device upper limit value, which is an upper limit value of the amount of power supplied from the power supply device, according to the record charge and discharge amount, and performs control such that the amount of power supplied from the power supply device does not exceed the power supply device upper limit value. In this way, as the power supply device upper limit value is set according to a change in the record charge and discharge amount based on the past power consumption, the stored amount of power in the power storage device is increased or decreased according to the operating state of the information processing device. Consequently, it is possible to prevent an excessive decrease in the stored amount of power in the power storage device, and to effectively utilize the power storage device, which prevents the facilities from being wasted, and improves the performance of the peak assist function.

(Supplementary Note 2)

The control device according to supplementary note 1, wherein the control unit calculates the record charge and discharge amount based on the past power consumption detected by the detection unit relative to the power supply device upper limit value set in the past, and sets the new power supply device upper limit value based on the record charge and discharge amount.

(Supplementary Note 3)

The control device according to supplementary note 2, wherein the control unit calculates the record charge and discharge amount representing a difference between records of a past charge amount and a past discharge amount of power with respect to the power storage device, based on a difference between a value of the past power consumption detected by the detection unit and the power supply device upper limit value set in the past, and sets the power supply device upper limit value based on the record charge and discharge amount.

According to the above-described invention, the control calculates the record charge and discharge amount based on the set power supply device upper limit value and the detected power consumption, and sets a power supply device upper limit value according thereto. As such, the record charge and discharge amount can be calculated with higher accuracy, and the power supply device upper limit value can be set appropriately according to a change in the past record charge and discharge amount. Consequently, it is possible to prevent an excessive decrease in the stored amount of power in the power storage device, and to effectively utilize the power storage device, which prevents the facilities from being wasted, and improves the performance of the peak assist function.

(Supplementary Note 4)

The control device according to any of supplementary notes 1 to 3, wherein the control unit calculates a predictive charge and discharge amount obtained by predicting a subsequent charge and discharge amount of power with respect to the power storage device, based on the past power consumption detected by the detection unit, and sets the new power supply device upper limit value based on the predictive charge and discharge amount and the record charge and discharge amount.

(Supplementary Note 5)

The control device according to supplementary note 4, wherein the control unit sets the new power supply device upper limit value such that the predictive charge and discharge amount and the record charge and discharge amount are balanced.

According to the above-described invention, the control device first calculates a predictive charge and discharge amount, which is a predictive value of a subsequent charge and discharge amount of the power storage device, according to the past power consumption of the information processing device. Then, the control device sets a power supply device upper limit value according to the predictive charge and discharge amount and the record charge and discharge amount. In this way, by using not only a record value of the past charge and discharge amount but also a predictive value of a subsequent charge and discharge amount, an appropriate power supply device upper limit value according to the operating state of the information processing device can be set. Consequently, it is possible to prevent an excessive decrease in the stored amount of power in the power storage device, and to effectively utilize the power storage device, which prevents the facilities from being wasted, and improves the performance of the peak assist function.

(Supplementary Note 6)

The control device according to supplementary note 4 or 5, wherein each time a preset period passes, the control unit calculates the predictive charge and discharge amount in a following period from the power consumption detected by the detection unit in a preceding period, calculates the record charge and discharge amount representing a record of a charge and discharge amount of power with respect to the power storage device from a period before the preceding period by a predetermined period up to the preceding period, and sets the new power supply device upper limit value based on the predictive charge and discharge amount and the record charge and discharge amount.

According to the above-described invention, first, a predictive charge and discharge amount is calculated from power consumption in a preceding predetermined period, and a record charge and discharge amount is calculated from power consumption in a past period up to the preceding period. Then, from these values, the control device sets a new power supply device upper limit value. As such, even if a charge and discharge amount based on the actual power consumption differs from a predictive charge and discharge amount, the actual charge and discharge amount relative to the predictive charge and discharge amount is calculated as a record charge and discharge amount in the subsequent period. As such, an appropriate power supply device upper limit value according to the operating state of the information processing device can be set. Consequently, it is possible to prevent an excessive decrease in the stored amount of power in the power storage device, and to effectively utilize the power storage device, which prevents the facilities from being wasted, and improves the performance of the peak assist function.

(Supplementary Note 7)

A power supply system comprising:

a power supply module including a power supply device and a power storage device; and a control device including a control unit that controls power supply from the power supply module to an information processing device, wherein the control device includes a detection unit that detects power consumption of the information processing device, and the control unit included in the control device controls a value representing a characteristic of an amount of power supplied from the power supply device not to exceed a preset power supply device upper limit value, calculates a record charge and discharge amount representing a record of a past charge and discharge amount of power with respect to the power storage device based on past power consumption detected by the detection unit, and sets a new power supply device upper limit value based on the record charge and discharge amount.

(Supplementary Note 8)

A non-transitory computer-readable storage medium storing a program comprising instructions for causing a control device to realize:

a control unit that controls power supply from a power supply device and a power storage device to an information processing device; and a detection unit that detects power consumption of the information processing device, wherein the control unit controls a value representing a characteristic of an amount of power supplied from the power supply device not to exceed a preset power supply device upper limit value, calculates a record charge and discharge amount representing a record of a past charge and discharge amount of power with respect to the power storage device based on past power consumption detected by the detection unit, and sets a new power supply device upper limit value based on the record charge and discharge amount.

(Supplementary Note 9)

A power control method for controlling power supply from a power supply device and a power storage device to an information processing device, the method comprising:

controlling a value representing a characteristic of an amount of power supplied from the power supply device not to exceed a preset power supply device upper limit value;

detecting power consumption of the information processing device; and calculating a record charge and discharge amount representing a record of a past charge and discharge amount of power with respect to the power storage device based on past power consumption detected, and setting a new power supply device upper limit value based on the record charge and discharge amount.

It should be noted that the program described above is stored in a storage device or on a computer-readable storage medium. For example, a storage medium is a portable medium such as a flexible disk, an optical disk, a magneto-optical disk, a semiconductor memory, or the like.

While the present invention has been described with reference to the exemplary embodiments described above, the present invention is not limited to the above-described embodiments. The form and details of the present invention can be changed within the scope of the present invention in various manners that can be understood by those skilled in the art.

The invention claimed is:

1. A control device comprising:
a processor configured to execute a program to implement:
a control unit that controls power supply from a power supply device and a power storage device to an information processing device, wherein a power demand of the information processing device is met first with power from the power supply device up to a preset power supply device upper limit, and if the power demand is higher than the preset power supply device upper limit, then the power storage device is controlled to assist the power supply device to meet the power demand; and
a detection unit that detects power consumption of the information processing device by measuring power supplied to the information processing device from the power supply device and the power storage device, wherein
the control unit controls a value representing a characteristic of an amount of power supplied from the power supply device not to exceed the preset power supply device upper limit value, calculates a record charge and discharge amount representing a record of a past charge and discharge amount of power with respect to the power storage device based on past power consumption detected by the detection unit, and sets a new power supply device upper limit value based on the record charge and discharge amount, wherein the power demand of the information processing device is met first with the power from the power supply device up to the new power supply device upper limit value, and if the power demand is higher than the new power supply device upper limit value, then the control unit controls the power storage device to assist the power supply device to meet the power demand.

2. The control device according to claim 1, wherein
the control unit calculates the record charge and discharge amount based on the past power consumption detected by the detection unit relative to the power supply device upper limit value set in the past, and sets the new power supply device upper limit value based on the record charge and discharge amount.

3. The control device according to claim 2, wherein
the control unit calculates the record charge and discharge amount representing a difference between records of a past charge amount and a past discharge amount of power with respect to the power storage device, based on a difference between a value of the past power consumption detected by the detection unit and the power supply device upper limit value set in the past, and sets the power supply device upper limit value based on the record charge and discharge amount.

4. The control device according to claim 1, wherein
the control unit calculates a predictive charge and discharge amount obtained by predicting a subsequent charge and discharge amount of power with respect to the power storage device, based on the past power consumption detected by the detection unit, and sets the new power supply device upper limit value based on the predictive charge and discharge amount and the record charge and discharge amount.

5. The control device according to claim 4, wherein
the control unit sets the new power supply device upper limit value such that the predictive charge and discharge amount and the record charge and discharge amount are balanced.

6. The control device according to claim 4, wherein
each time a preset period passes, the control unit calculates the predictive charge and discharge amount in a following period from the power consumption detected by the detection unit in a preceding period, calculates the record charge and discharge amount representing a record of a charge and discharge amount of power with respect to the power storage device from a period before the preceding period by a predetermined period up to the preceding period, and sets the new power supply device upper limit value based on the predictive charge and discharge amount and the record charge and discharge amount.

7. A power supply system comprising:
a power supply module including a power supply device and a power storage device; and
a control device comprising a processor configured to execute a program to implement a control unit that controls power supply from the power supply module to an information processing device, wherein a power demand of the information processing device is met first with power from the power supply device up to a preset power supply device upper limit, and if the power demand is higher than the preset power supply device upper limit, then the power storage device is controlled to assist the power supply device to meet the power demand, wherein
the processor of the control device is further configured to implement the program to implement a detection unit that detects power consumption of the information processing device by measuring power supplied to the information processing device from the power supply device and the power storage device, and
the control unit included in the control device controls a value representing a characteristic of an amount of power supplied from the power supply device not to exceed the preset power supply device upper limit value, calculates a record charge and discharge amount representing a record of a past charge and discharge amount of power with respect to the power storage device based on past power consumption detected by the detection unit, and sets a new power supply device upper limit value based on the record charge and discharge amount, wherein the power demand of the information processing device is met first with the power from the power supply device up to the new power supply device upper limit value, and if the power demand is higher than the new power supply device upper limit value, then the control unit controls the power storage device to assist the power supply device to meet the power demand.

8. A non-transitory computer-readable storage medium storing a program that, when executed by a control device comprising a processor, cause the control device to perform a method, the method comprising:
controlling power supply from a power supply device and a power storage device to an information processing device, wherein a power demand of the information processing device is met first with power from the power supply device up to a preset power supply device upper limit, and if the power demand is higher than the preset power supply device upper limit, then the power storage device is controlled to assist the power supply device to meet the power demand; and
detecting power consumption of the information processing device by measuring power supplied to the information processing device from the power supply device and the power storage device,
wherein controlling power supply includes controlling a value representing a characteristic of an amount of power supplied from the power supply device not to exceed the preset power supply device upper limit value, calculates a record charge and discharge amount representing a record of a past charge and discharge amount of power with respect to the power storage device based on past power consumption detected by the detection unit, and sets a new power supply device upper limit value based on the record charge and discharge amount, wherein the power demand of the information processing device is met first with the power from the power supply device up to the new power supply device upper limit value, and if the power demand is higher than the new power supply device upper limit value, then the power storage device is controlled to assist the power supply device to meet the power demand.

9. A power control method for controlling power supply from a power supply device and a power storage device to an information processing device such that a power demand of the information processing device is met first with power from the power supply device up to a preset power supply device upper limit, and if the power demand is higher than the preset power supply device upper limit, then the power storage device is controlled to assist the power supply device to meet the power demand, the method comprising:
controlling, with a processor, a value representing a characteristic of an amount of power supplied from the power supply device not to exceed the preset power supply device upper limit value;
detecting, with the processor, power consumption of the information processing device by measuring power supplied to the information processing device from the power supply device and the power storage device;

calculating, with the processor, a record charge and discharge amount representing a record of a past charge and discharge amount of power with respect to the power storage device based on past power consumption detected, and setting a new power supply device upper limit value based on the record charge and discharge amount; and meeting the power demand of the information processing device first with the power from the power supply device up to the new power supply device upper limit value, and if the power demand is higher than the new power supply device upper limit value, then controlling the power storage device to assist the power supply device to meet the power demand.

\* \* \* \* \*